T. DIXON.
MEANS FOR OPERATING SWITCHES FOR TRAM ROADS IN MINES, QUARRIES, OR THE LIKE.
APPLICATION FILED NOV. 29, 1918.

1,313,586. Patented Aug. 19, 1919.

INVENTOR:
Thomas Dixon
By Wm Wallace White
ATTY.

UNITED STATES PATENT OFFICE.

THOMAS DIXON, OF LANGLEY PARK, ENGLAND.

MEANS FOR OPERATING SWITCHES FOR TRAM-ROADS IN MINES, QUARRIES, OR THE LIKE.

1,313,586. Specification of Letters Patent. Patented Aug. 19, 1919.

Application filed November 29, 1918. Serial No. 264,753.

*To all whom it may concern:*

Be it known that I, THOMAS DIXON, a subject of the King of Great Britain, and resident of 17 Langley street, Langley Park, in the county of Durham, England, have invented certain new and useful Improvements in or Relating to Means for Operating Switches for Tram-Roads in Mines, Quarries, or the like, of which the following is a specification.

This invention relates to means for operating facing points in which a T shaped lever is adapted to be moved by a passing vehicle, the stem of the T lever being pivoted to a bar joining the tongues of the switch.

The object of this invention is to provide an improved apparatus of this type for automatically operating switches so as to divert tubs, bogies, or other vehicles, alternatively, one to one road, and another to another road.

Apparatus made in accordance with this invention is characterized in that the cross arms of the T shaped lever are connected by links to cranks mounted on a shaft on which is also mounted a spoked wheel adapted to be given two quarter turns by the axles of a vehicle striking the spokes as the vehicle passes over the shaft.

Referring to the drawings:—

Figure 1:
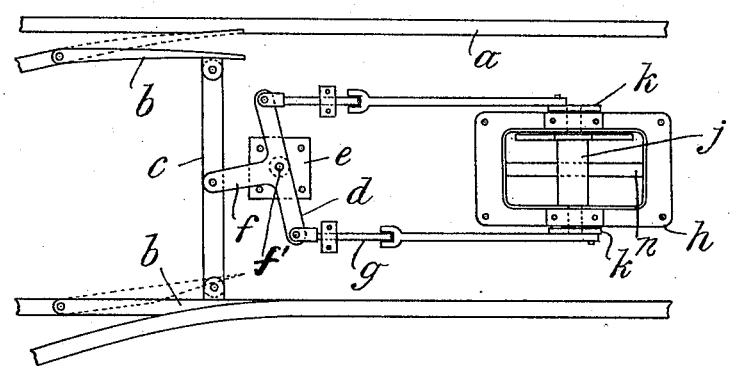
Figure 1 is a plan of one form of apparatus made in accordance with this invention.
Figure 2:
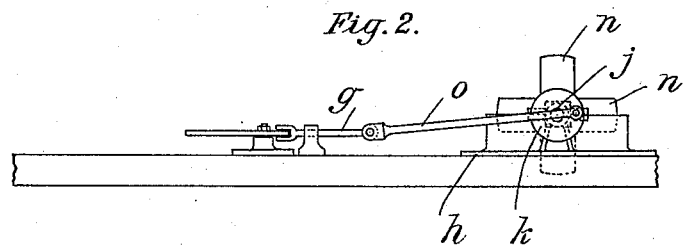
Fig. 2 is an elevation.

$a\ a$ are the tram rails, $b$, $b$ the switch rails or points, $c$ the cross-bar connecting the points. $d$ is a T shaped lever mounted on a stand $e$. The stem $f$ of the T shaped lever is connected to the cross-bar $c$, by a pin $f'$, a slot $f^2$ being provided in the stem of the T bar to allow of the rotation of the stem. To each cross arm of the T shaped lever is connected a link $g$. Between the rails of the track is disposed a frame $h$ on which is mounted a square shaft $j$ carrying at each end a crank $k\ k$. On the shaft $j$ is a hub provided with four spokes $n\ n$. Each crank $k\ k$ is connected to the links $g$ by a connecting rod $o$.

In use, as the vehicle passes over the frame $h$ the axles engage the spokes $n\ n$ and each gives the crank $k$ quarter turn, two quarter turns moving the points from one extreme position to the other. Each truck consequently shifts the points from one piston to the other before it reaches the points. Alternate self acting switches are not new *per se*.

What I claim as my invention and desire to secure by Letters Patent is:—

Means for operating facing points of a track by a pair of axles of a passing vehicle comprising a bar joining the tongues of the points, a pivoted T shaped lever disposed horizontally between the rails of the track, the stem of the T lever being connected to said bar by a pin and slot connection, a horizontal shaft mounted between the rails of the track, two cranks and a four spoke hub on said shaft and links connecting said cranks to the cross arms of the said T lever.

In testimony whereof I have signed my name to this specification.

THOMAS DIXON.

Copies of this patent may be obtained for five cents each, by addressing the "Commissioner of Patents, Washington, D. C."